Oct. 10, 1939.  A. ROSE  2,175,702
ELECTRON DISCHARGE DEVICE
Filed Feb. 9, 1938
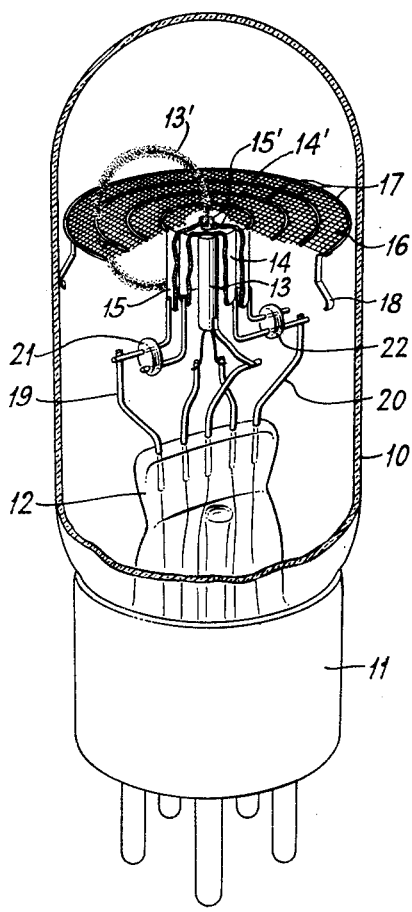
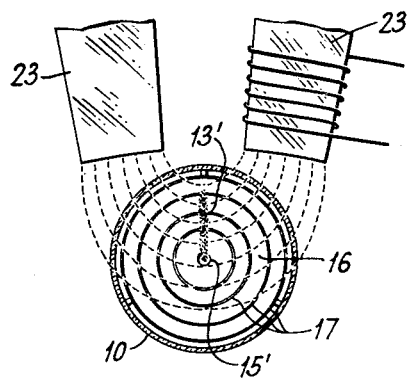
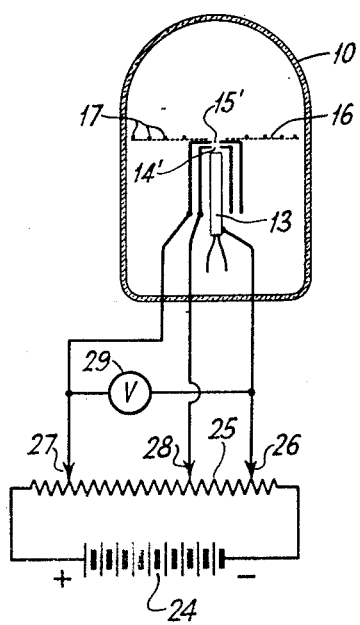
INVENTOR.
ALBERT ROSE
BY Charles McClair
ATTORNEY.

Patented Oct. 10, 1939

2,175,702

UNITED STATES PATENT OFFICE 2,175,702

ELECTRON DISCHARGE DEVICE

Albert Rose, East Orange, N. J., assignor, by mesne assignments, to Radio Corporation of America, New York, N. Y., a corporation of Delaware Application February 9, 1938, Serial No. 189,498

3 Claims. (Cl. 250—27.5)

My invention relates to measuring or indicating devices, more particularly to such devices for measuring the intensity or strength of a magnetic field.

Means for measuring magnetic field strengths previously used suffer from various handicaps of convenience or limitations of application. For example, some devices require a separate measuring operation for each point in the field, others are difficult to orient with respect to the field, and still others are limited to air core magnetic circuits. In practically all the devices the problem of orienting the measuring device to record the total field strength requires a series of observations to obtain the maximum reading at each point, and it is difficult if not impossible to take a continuous reading from point to point in the field.

It is therefore the principal object of my invention to provide a novel and improved measuring device particularly suitable for measuring the intensity or strength of magnetic fields. More specifically it is an object of my invention to provide such an intensity field measuring device which can be quickly oriented with respect to the magnetic field by visual observation, and in which a continuous observation of the magnitude and orientation as well as the variation of the magnetic field can be made by moving the device over the volume to be examined and to provide such a device in which the scale can be continuously varied for rendering the device suitable for measuring magnetic fields varying within wide limits.

Briefly, a preferred embodiment of my invention includes an electron discharge device having an envelope containing a gas, such for example as argon, at a low pressure. Mounted within the envelope is an electron beam forming device comprising a cathode, preferably surrounded by a control electrode having a small aperture through which the electrons are focused and mounted transversely of the beam and close to the end of the control electrode, an anode of fine mesh or screen material on which equal radial distances are marked. The wall and anode screen are preferably coated with material which glows when bombarded by electrons. The gas serves to render the beam visible and to keep the beam focused as well as to prevent wall charges influencing the beam. When placed within a magnetic field and properly oriented the electrons follow a curved path, the radius of which is inversely proportional to the field intensity so that a circular loop of light intersecting the anode screen is formed within the envelope.

The novel features which I believe to be characteristic of my invention are set forth with particularity in the appended claims, but the invention itself will best be understood by reference to the following description taken in connection with the accompanying drawing in which Figure 1 is a perspective with parts broken away to show details of construction of an electron discharge device embodying my invention, Figure 2 is a top end view with envelope broken away of a device shown in Figure 1 placed in a magnetic field, and Figure 3 shows a schematic circuit diagram employing a tube made according to my invention.

In Figure 1 an electron discharge device made according to my invention includes an envelope 10 containing a gaseous medium, for example argon at about five microns pressure, and having a conventional base 11 and press 12, which supports the mount. The mount comprises an indirectly heated cathode 13 surrounding the upper end of which is a cylindrical control electrode 14 having an aperture 14' through which the electrons are focused. Surrounding the control electrode 14 is another cylindrical member 15 closed at the top and provided with an aperture 15' aligned with the aperture 14' through which the electrons are directed. This last electrode, which comprises the anode, supports a transverse disclike screen element 16 marked, for example, by circular wires 17 secured to the surface of the screen. The electrodes are supported by the lead-in and support wires in the press, the lead 19 serving as the lead for the anode 15 and the support wire 20 serving as a lead for the control electrode 14, the glass beads 21 and 22 maintaining the anode and control electrode in spaced insulated relationship with respect to each other. Spring spacer members 18 resiliently support the upper end of the mount within the envelope 10. In use the tube is positioned with its axis normal to the field to be measured, for example, a field produced by an electromagnet 23, as shown in Figure 2.

The circuit arrangement supplying the various voltages to the electrodes is shown in Figure 3. The source of supply 24 is provided with a voltage divider arrangement 25 on which are mounted the sliders 26, 27 and 28 connected to the leads of the cathode, anode and control electrodes. Various voltage arrangements can be provided. In operation electrons from the cathode 13 are focused through the apertures in the control electrode 14 and anode 15 following a curved path such as shown at 13' in Figures 1 and 2 and made visible by ionization of the gas within the envelope, the gas also keeping the beam focused and preventing wall charges from influencing the beam. If the tube is not properly aligned with respect to the field the beam follows a helical path terminating on the glass wall. If properly aligned the path of the electrons lies in a plane perpendicular to the disc electrode 16, the lower part of the beam making it easier to visually orient the tube in the field to be measured. While the electrode 16 could be made of solid material it would not be as easy to align the device with a field for measuring purposes. It is also possible to support the rings or circular wires 17 in space without using the mesh disc for their support. It is desirable to have the mesh disc or rings alone extend across the envelope from wall to wall so that only the anode field exists above the disc or rings giving the electrons a substantially constant velocity in this space, which requirement is necessary to provide a satisfactory indicating device. The formula below is based on constant velocity of the electrons. The greater the intensity or strength of the field the smaller the radius of the circle for given voltage conditions on the electrodes. In operation a potential between 20 and 400 volts is applied to the anode and when the tube axis is held normal to the magnetic field so that the beam forms a semicircle above the mesh, the intensity of the magnetic field can be readily determined by the expression:

$$H = \frac{m}{e}\frac{v}{r} = \left(2\frac{m}{e}V\right)^{1/2}\frac{1}{r}10^4 = 3.36\frac{V^{1/2}}{r}$$

where
 H = magnetic field strength (gauss)
 e = charge on the electron (emu)
 m = mass of the electron (grams)
 v = velocity of the electron (cm/sec.) (computed directly from anode voltage)
 r = radius of circle
 V = anode potential (volts)

Thus it is possible to assign different known values to the rings 17 when the proper anode potentials are applied to the anode so that the device can be used as a direct reading device if desired. By varying the anode potential it is possible to vary the scale. A voltmeter 29 may be provided for reading the anode voltage.

Hence my invention provides a device which permits the examination of the magnitude and direction of the magnetic field in a large volume of space and to do this conveniently, continuously, visually and quickly with an accuracy of better than 10%.

While I have indicated the preferred embodiment of my invention of which I am now aware and have also indicated only one specific application for which my invention may be employed it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A device for visually indicating the intensity of a magnetic field and including an electron discharge device having an envelope containing an ionizable medium, a cathode within said envelope, a control electrode positioned adjacent said cathode and having an aperture through which electrons are focused into a beam, an anode electrode adjacent said control electrode and having an aperture in line with the aperture in said control electrode through which electrons are projected with sufficient velocity to ionize the ionizable medium along the beam, said electrons following a circular path when said device is positioned in and with its axis normal to a magnetic field and means for measuring the intensity of the magnetic field, said means including a plurality of concentric circular elements lying in a plane adjacent said anode, said circular path of electrons intersecting the plane of said rings whereby the diameter of said circular paths may be measured to indicate the intensity of the magnetic field.

2. An electron discharge device including an envelope containing an ionizable medium, a cathode, a control electrode surrounding said cathode and closed at one end, said closed end having an aperture through which electrons are focused into a beam and an anode electrode surrounding said cathode and control electrode and comprising a cylinder having a closed end provided with an aperture in line with the aperture in said control electrode, and a disc-like foraminous element supported by the closed end of said anode electrode through which electrons may pass to ionize the gas within the tube and through which electrons may be returned in a curved path when said device is positioned in and with its axis transverse to a magnetic field.

3. An electron discharge device including an envelope containing an ionizable medium, a cathode, a control electrode surrounding said cathode and closed at one end, said closed end having an aperture through which electrons are focused, and an anode electrode surrounding said cathode and control electrode and comprising a cylinder having a closed end provided with an aperture in line with the aperture in said control electrode, and a disc-like foraminous element supported by the closed end of said anode electrode through which electrons may pass with sufficient velocity to ionize the gas within the tube and through which electrons may be returned in a curved path when said device is positioned in and with its axis transverse to a magnetic field, said foraminous disc-like element being provided with a plurality of concentric ring-like elements of different diameters.

ALBERT ROSE.